United States Patent
Jiang

(10) Patent No.: US 11,588,534 B2
(45) Date of Patent: Feb. 21, 2023

(54) TIMER CONTROL METHOD AND TIMER CONTROL APPARATUS

(71) Applicant: Beijing Xiaomi Mobile Software Co., Ltd., Beijing (CN)

(72) Inventor: Xiaowei Jiang, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 0 days.

(21) Appl. No.: 17/260,503

(22) PCT Filed: Jul. 16, 2018

(86) PCT No.: PCT/CN2018/095840
§ 371 (c)(1),
(2) Date: Jan. 14, 2021

(87) PCT Pub. No.: WO2020/014841
PCT Pub. Date: Jan. 23, 2020

(65) Prior Publication Data
US 2021/0306056 A1    Sep. 30, 2021

(51) Int. Cl.
*H04B 7/06*       (2006.01)
*H04W 74/00*      (2009.01)
(Continued)

(52) U.S. Cl.
CPC ........ *H04B 7/0695* (2013.01); *H04W 74/008* (2013.01); *H04W 74/0833* (2013.01); *H04W 76/19* (2018.02); *H04W 80/02* (2013.01)

(58) Field of Classification Search
CPC . H04B 7/0695; H04B 7/0602; H04W 74/008; H04W 74/0833; H04W 76/19;
(Continued)

(56) References Cited

U.S. PATENT DOCUMENTS 11,057,936 B2 *  7/2021  Wang ................... H04L 1/1614
2014/0198729 A1  7/2014  Bostrom et al.
(Continued)

FOREIGN PATENT DOCUMENTS

CN    103718637 A    4/2014
CN    107079459 A    8/2017
(Continued)

OTHER PUBLICATIONS

European Patent Office, Extended European Search Report Issued in Application No. 18926602.6, dated Jun. 30, 2021, 9 pages.
(Continued)

*Primary Examiner* — Harry H Kim
(74) *Attorney, Agent, or Firm* — Finnegan, Henderson, Farabow, Garrett & Dunner, L.L.P.

(57) ABSTRACT

The present disclosure relates to a timer control method, which is applicable to an electronic device. The method includes: when a medium access control layer receives a beam failure instance indication sent by a physical layer, determining whether a count value of a beam failure indication counter is greater than or equal to a preset value; if the count value of the beam failure indication counter is greater than or equal to the preset value, triggering a random access; determining whether to initiate the triggered random access; if it is determined to initiate the triggered random access, upon initiating the triggered random access, resetting or restarting a beam failure recovery timer. According to the embodiments of the present disclosure, the case that user equipment occupies resources of contention-free random access for a long time can be avoided.

15 Claims, 5 Drawing Sheets

(51) Int. Cl.
    *H04W 74/08*     (2009.01)
    *H04W 76/19*     (2018.01)
    *H04W 80/02*     (2009.01)
    *H04W 16/28*     (2009.01)
    *H04L 69/28*     (2022.01)

(58) Field of Classification Search
CPC ... H04W 80/02; H04W 16/28; H04W 74/085; H04L 69/28
See application file for complete search history.

(56) References Cited

U.S. PATENT DOCUMENTS

| | | | |
|---|---|---|---|
| 2018/0138962 | A1 | 5/2018 | Islam et al. |
| 2019/0245737 | A1* | 8/2019 | Zhou ............... H04B 7/088 |
| 2019/0394082 | A1* | 12/2019 | Cirik ............... H04W 76/28 |
| 2021/0006457 | A1* | 1/2021 | You ............... H04L 5/001 |
| 2021/0250227 | A1* | 8/2021 | Bai ............... H04L 5/0023 |

FOREIGN PATENT DOCUMENTS

| | | |
|---|---|---|
| CN | 108260212 A | 7/2018 |
| CN | 108260241 A | 7/2018 |
| RU | 2544758 C1 | 3/2015 |
| RU | 2599619 C1 | 10/2016 |
| WO | WO 2018/083624 A1 | 5/2018 |
| WO | WO 2018/129300 A1 | 7/2018 |

OTHER PUBLICATIONS

ISA State Intellectual Property Office of the People's Republic of China, Written Opinion of the International Searching Authority Issued in Application No. PCT/CN2018/095840, dated Apr. 10, 2019, WIPO, 8 pages.
Sony (resubmission of R2-1807787), "Beam failure detection and maintenance", 3GPP TSG RAN WG2 AH-1807 Meeting, Montreal, Canada, R2-1810119, Jul. 2-6, 2018, 6 pages.
ZTE, "Discussion on the Beam failure recovery timer", 3GPP TSG-RAN WG2 Meeting #102, Busan, Korea, R2-1807405, May 21-25, 2018, 5 pages.
Sharp, "Remaining issues of beam failure recovery", 3GPP TSG RAN WG2 Meeting #102, Busan, Korea, R2-1808242, May 21-25, 2018, 5 pages.
Huawei, HiSilicon,"Discussion on beam failure recovery for SCell", 3GPP TSG-RAN WG2 Meeting 102, Busan, Korea, R2-1807975, May 21-25, 2018, 9 pages.
ISA State Intellectual Property Office of the People's Republic of China, International Search Report Issued in Application No. PCT/CN2018/095840, dated Apr. 10, 2019, WIPO, 4 pages.
Sharp, "Remaining issues on beam failure recovery", 3GPP TSG RAN WG2 NR Ad hoc 0118, Vancouver, Canada, R2-1800560, Jan. 22-26, 2018, 13 pages.
CATT, "Remaining issues on beam failure recovery", 3GPP TSG RAN WG1 Meeting #93 Busan, Korea, R1-1806281, May 21-25, 2018, 3 pages.
RAN1 ,"LS reply on beam failure recovery", 3GPP TSG RAN WG1 Meeting #92 Athens, Greece, R1-1803348, Feb. 26-Mar. 2, 2018, 2 pages.
MediaTek Inc., "Summary 2 on Remaing issues on Beam Failure Recovery", 3GPP TSG RAN WG1 Meeting #92bis Sanya, China, R1-1805689, Apr. 16-20, 2018, 21 pages.
State Intellectual Property Office of the People's Republic of China, Second Office Action Issued in Application No. 2018800013065, dated Sep. 19, 2019, 9 pages.
State Intellectual Property Office of the People's Republic of China, First Office Action and Search Report Issued in Application No. 2018800013065, dated Jun. 28, 2019, 12 pages.
Examination Report for Indian Application No. 202147005518, dated Jan. 11, 2022, 7 pages.
Notice of Reasons for Refusal for Japanese Application No. 2021-502479, dated Mar. 11, 2022, 6 pages.
3GPP TS 38.321 V15.2.0 (Jun. 2018), "Technical Specification Group Radio Access Network; NR; Medium Access Control (MAC) protocol specification (Release 15)", Jun. 2018, 73 pages.
Notice of Reasons for Refusal for Japanese Patent Application No. 2021-502479, dated Aug. 25, 2022, 6 pages.
Office Action Issued in Application No. 10-2021-7003982, from the Korean Intellectual Property Office, dated Dec. 19, 2022, 12 pages.

\* cited by examiner

TIMER CONTROL METHOD AND TIMER CONTROL APPARATUS

CROSS REFERENCE TO RELATED APPLICATIONS

This application is a national phase application based on International Application No. PCTICN2018/095840, filed Jul. 16, 2018, the content of which is incorporated herein by reference.

TECHNICAL FIELD

The present disclosure relates to communication technology, and in particular to timer control methods, timer control apparatuses, electronic devices and computer readable storage media.

BACKGROUND

In new radio (NR), user equipment (UE) may monitor a beam signal. When the monitored beam signal does not meet the requirement, a physical layer may send a beam failure instance indication to a medium access control layer as one record of beam failure. In a case that the beam failure indication counter (BFI_COUNTER) indicates a value greater than or equal to a preset value while the medium access control layer still receives a beam failure instance indication sent by the physical layer, the UE may trigger a random access, and the random access initiated accordingly may be a contention-free random access (CFRA) or a contention based random access (CBRA).

In related art, a beam failure recovery timer is provided and the timer is reset or restarted upon the UE triggers the random access. If the timer does not expire, the UE preferably uses resources for contention-free random access to initiate a contention-free random access; while the timer expires, the UE preferably uses resources for contention random access to initiate a contention based random access. In this way, the UE would not occupy one type of resources for a long time to initiate one type of random access.

In related art, if a random access is currently ongoing by the UE, when the beam failure indication counter indicates a value greater than or equal to the preset value and the medium access control layer receives a beam failure instance indication sent by the physical layer, the UE may trigger another random access. Then, the UE shall determine whether to continue the ongoing random access or to initiate the triggered random access. In most cases, the UE may continue the ongoing random access.

The beam failure recovery timer for the ongoing random access is timing and will be reset or restarted upon triggering the triggered random access. However, when the UE determine to continue the ongoing random access, the beam failure recovery timer should not be reset but continue timing, that is, continue timing based on the current timing value.

It can be seen that, according to the related art, the triggered random access may cause a resetting of the beam failure recovery timer even when the beam failure recovery timer should not be reset. In this case, this timer will keep un-expired for an over long time, and the UE will use resources for contention-free random access to initiate the contention-free random access during the over long time, which causes an excessive occupation of resources for contention-free random access.

SUMMARY

In view of this, the embodiments of the present disclosure provide timer control methods, timer control apparatuses, electronic devices, and computer-readable storage media.

According to a first aspect of the embodiments of the present disclosure, a timer control method is provided, which is applicable to an electronic device, and the method includes:

when a medium access control layer receives a beam failure instance indication sent by a physical layer, determining whether a count value of a beam failure indication counter is greater than or equal to a preset value;

if the count value of the beam failure indication counter is greater than or equal to the preset value, triggering a random access;

determining whether the triggered random access is to be initiated;

if it is determined that the triggered random access is to be initiated, upon initiating the triggered random access, resetting or restarting a beam failure recovery timer.

Optionally, determining whether the triggered random access is to be initiated, includes:

if a random access is currently ongoing by the electronic device, determining whether to initiate the triggered random access or continue the currently ongoing random access according to first configuration information;

if a determination result indicates to initiate the triggered random access, initiating the triggered random access.

Optionally, the method further includes:

after the random access is triggered, and before the triggered random access is initiated, keeping the beam failure recovery timer timing based on the current timing value.

Optionally, the method further includes:

before resetting or restarting the beam failure recovery timer, determining whether the beam failure recovery timer is to be reset or restarted according to second configuration information;

if a determination result is that the beam failure recovery timer is to be reset or restarted, resetting or restarting the beam failure recovery timer.

Optionally, the method further includes:

when the triggered random access is successful, setting a count value of the beam failure indication counter to zero.

Optionally, resetting or restarting the beam failure recovery timer includes:

determining a serving cell corresponding to the beam failure indication counter;

resetting or restarting the beam failure recovery timer for the serving cell.

Optionally, the serving cell includes at least one of the following:

a primary cell, a primary secondary cell, and a serving cell other than the primary cell and the primary secondary cell.

According to a second aspect of the embodiments of the present disclosure, a timer control apparatus is provided, which is applicable to an electronic device, and the apparatus includes:

a count value determining module, configured to, when a medium access control layer receives a beam failure instance indication sent by a physical layer, determine whether a count value of a beam failure indication counter is greater than or equal to a preset value;

a random access module, configured to, if the count value of the beam failure indication counter is greater than or equal to the preset value, trigger a random access;

an initiation determining module, configured to determine whether the triggered random access is to be initiated;

a timer control module, configured to, in case it is determined that the triggered random access is to be initiated, upon initiating the triggered random access, reset or restart the beam failure recovery timer.

Optionally, the initiation determining module is configured to: in case that a random access is currently ongoing by the electronic device, determine whether to initiate the triggered random access or continue the currently ongoing random access according to first configuration information;

wherein, if a determination result indicates to initiate the triggered random access, the initiation determining module initiates the triggered random access.

Optionally, the timer control module is further configured to, after the random access is triggered, and before the triggered random access is initiated, keep the beam failure recovery timer timing based on the current timing value.

Optionally, the apparatus further includes:

a control determining module, configured to, before the timer control module resets or restarts the beam failure recovery timer, determine whether the beam failure recovery timer is to be reset or restarted according to second configuration information;

if a determination result is that the beam failure recovery timer is to be reset or restarted, reset or restart the beam failure recovery timer.

Optionally, the apparatus further includes:

a counter control module, configured to, when the triggered random access is successful, set a count value of the beam failure indication counter to zero.

Optionally, the timer control module includes:

a cell determining submodule, configured to determine a serving cell corresponding to the beam failure indication counter;

a timer control submodule, configured to reset or restart a beam failure recovery timer for the serving cell.

Optionally, the serving cell includes at least one of the following:

a primary cell, a primary secondary cell, and a serving cell other than the primary cell and the primary secondary cell.

According to a third aspect of the embodiments of the present disclosure, an electronic device is provided, including:

a processor;

a memory for storing instructions executable by the processor;

wherein, the processor is configured to perform the method of any of the above embodiments.

According to a fourth aspect of the embodiments of the present disclosure, computer-readable medium storing computer program is provided, when the computer program is executed by a processor, the steps in method of any of the above embodiments are implemented.

According to the embodiments of the present disclosure, the beam failure recovery timer is reset or restarted only when initiating the triggered random access, that is, when the random access is triggered, the beam failure recovery timer is not reset or restarted.

As such, in a case that the UE chooses to continue the ongoing random access, the beam failure recovery timer can be prevented from being reset when it does not expire. This ensures that, in a case that the UE chooses to continue the ongoing random access, when a random access is triggered, the beam failure recovery timer can continue timing and is reset or restarted until when the timer expires or the triggered random access is initiated. In this way, the UE can be prevented from using resources for contention-free random access to initiate the contention-free random access for an over long time due to that the beam failure recovery timer is reset in advance without expiration, and thus preventing an excessive occupation for resources of contention-free random access.

BRIEF DESCRIPTION OF THE DRAWINGS

In order to more clearly illustrate the technical solutions in the examples of the present application, the drawings used in the description of the examples will be briefly described below. It is obvious that the drawings in the following description are only some examples of the present application, and other drawings may also be obtained from those of ordinary skill in the art in view of the drawings.

DETAILED DESCRIPTION OF THE EMBODIMENTS

The technical solutions in the examples of the present application are clearly and completely described in the following with reference to the drawings in the examples of the present application. It is obvious that the described examples are only a part of the examples of the present application, and not all of the examples. All other examples obtained by a person of ordinary skill in the art based on the examples of the present application without departing from the inventive scope are within the scope of the present application.

Figure 1:
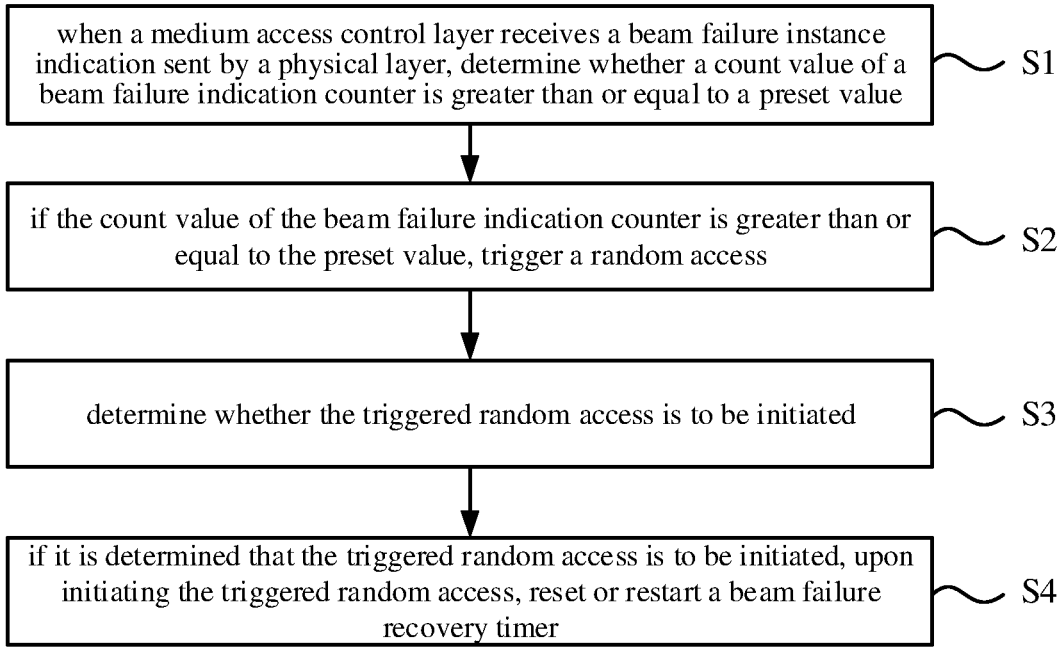
FIG. 1 is a schematic block diagram illustrating an apparatus for controlling a timer according to some embodiments of the present disclosure.

FIG. 1 is a schematic block diagram illustrating an apparatus for controlling a timer according to some embodiments of the present disclosure. The timer control method shown in this embodiment may be applied to an electronic device. The electronic device may be user equipment (UE)

for communication. The UE may be a mobile phone, a tablet computer, a smart wearable device, etc., where the UE may communicate via NR.

As shown in FIG. 1, the timer control method includes the following steps:

At step S1, when a medium access control layer receives a beam failure instance indication sent by a physical layer, whether a count value of a beam failure indication counter is greater than or equal to a preset value is determined;

At step S2, if the count value of the beam failure indication counter is greater than or equal to the preset value, a random access is triggered;

At step S3, whether the triggered random access is to be initiated is determined;

At step S4, if it is determined that the triggered random access is to be initiated, upon initiating the triggered random access, the beam failure recovery timer is reset or restarted.

In one embodiment, the beam failure recovery timer is reset or restarted only when the triggered random access is initiated, that is, when the random access is triggered, the beam failure recovery timer is not reset or restarted.

Accordingly, when the random access is triggered, if a random access is currently ongoing by the UE, it can be avoided that when the UE chooses to continue the ongoing random access, the beam failure recovery timer is reset or restarted before expiration. This ensures that when the UE chooses to continue the ongoing random access, the beam failure recovery timer may not reset or restart due to the triggered random access, but can continue to timing until the timer expires or initiates the triggered random access, which avoid causing the UE not expires due to the beam failure recovery timer is reset in advance, and the UE select resources of contention-free random access for initiating the contention-free random access for a long time, which causes excessive occupation of resources of contention-free random access.

Figure 2:
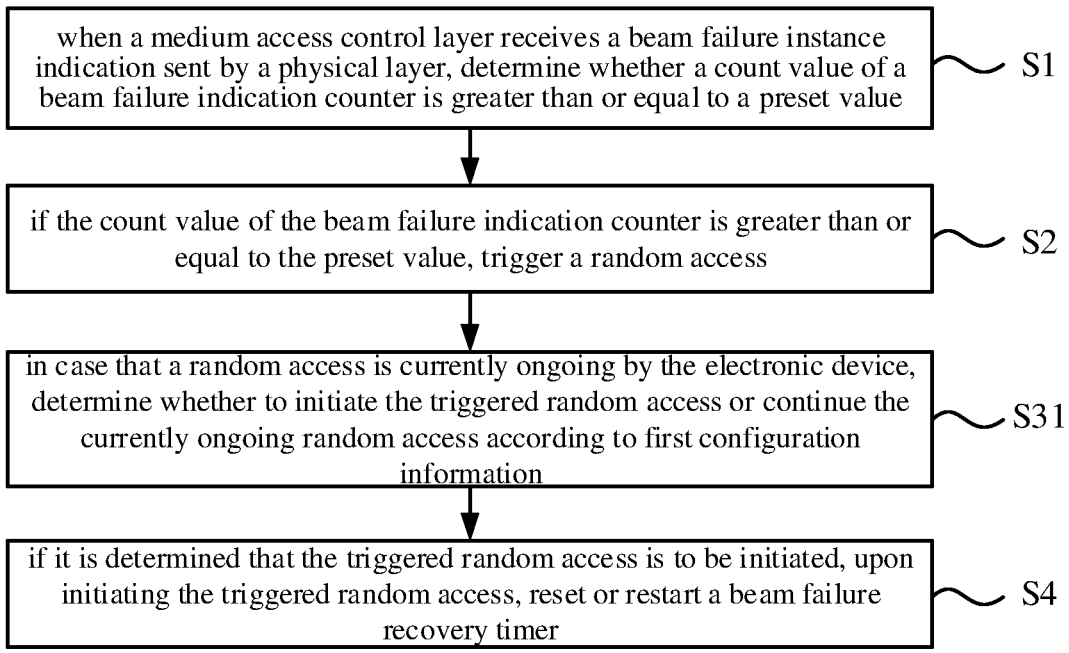
FIG. 2 is a schematic flowchart illustrating another method for controlling a timer according to some embodiments of the present disclosure.

FIG. 2 is a schematic flowchart illustrating another method for controlling a timer according to some embodiments of the present disclosure. As shown in FIG. 2, determining whether to initiate the triggered random access includes:

At step S31, in case that a random access is currently ongoing by the electronic device, whether to initiate the triggered random access or continue the currently ongoing random access is determined according to first configuration information.

If a determination result indicates to initiate the triggered random access, the triggered random access is initiated.

In one embodiment, when the random access is triggered, but a random access is currently ongoing by the electronic device, the UE may determine whether to initiate the triggered random access or continue the currently ongoing random access according to the first configuration information. If it is determined to initiate the triggered random access, the current random access may be refrained from and the triggered random access may be initiated, and if it is determined to continue the currently ongoing random access, then the current ongoing random access may be continued without initiating the triggered random access.

Accordingly, by setting the first configuration information, it is possible to control whether the UE initiates the triggered random access or continues the currently ongoing random access, which improves the controllability of the UE.

The first configuration information may be configured by a base station in real time, for example, the first configuration information may be sent by the base station through a radio resource control (RRC) message, or pre-stored in the electronic device, for example, set up by the manufacturer of the electronic device when the electronic device leaves the factory.

Optionally, the method further includes:
after the random access is triggered, and before the triggered random access is initiated, keeping the beam failure recovery timer timing based on the current timing value.

That is, when the random access is triggered, the beam failure recovery timer is not reset or restarted, and when the triggered random access is initiated, the beam failure recovery timer is reset or restarted.

Figure 3:
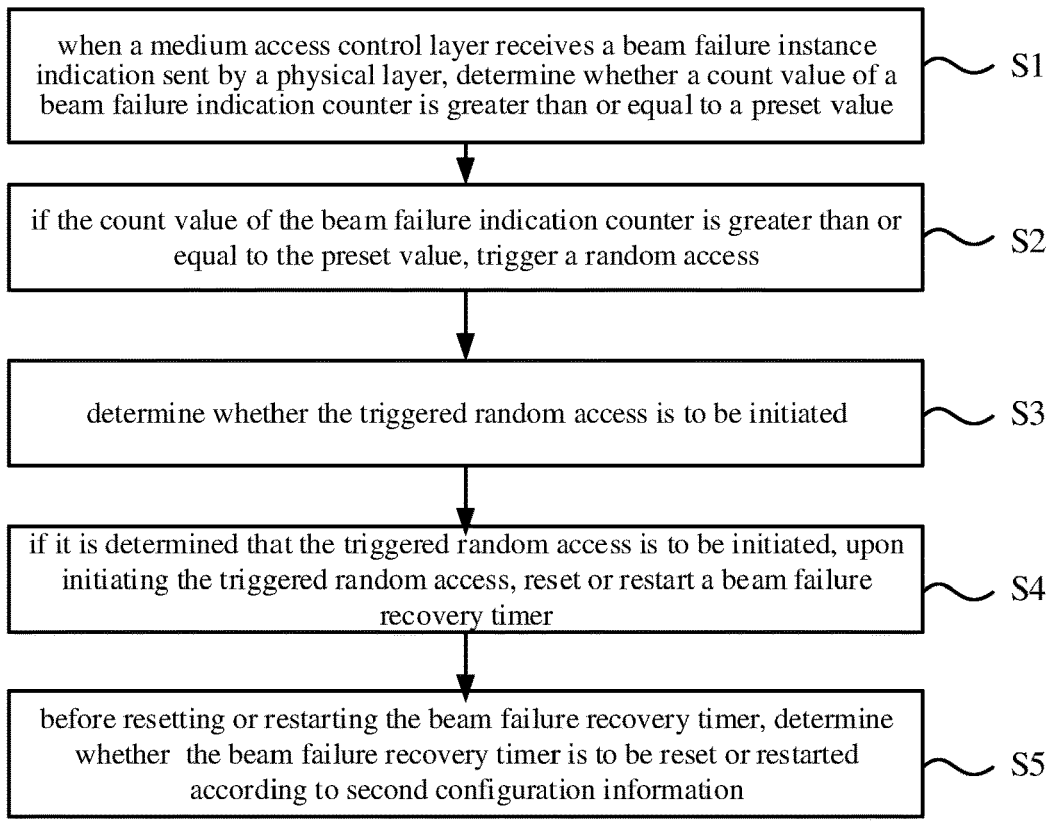
FIG. 3 is a schematic flowchart illustrating still another method for controlling a timer according to some embodiments of the present disclosure.

FIG. 3 is a schematic flowchart illustrating still another method for controlling a timer according to some embodiments of the present disclosure. As shown in FIG. 3, the method further includes:

At step S5, before resetting or restarting the beam failure recovery timer, whether the beam failure recovery timer is to be reset or restarted is determined according to second configuration information;

If a determination result is that the beam failure recovery timer is to be reset or restarted, the beam failure recovery timer is reset or restarted.

In one embodiment, upon initiating the triggered random access, the UE may determine whether the beam failure recovery timer is to be reset or restarted according to the second configuration information. If the determination result is that the beam failure recovery timer is to be reset or restarted, the beam failure recovery timer may be reset or restarted, and if the determination result is that the beam failure recovery timer is not to be reset or restarted, the beam failure recovery timer may be kept running, that is, continue timing based on the current timing value.

For example, the beam failure recovery timer is determined to be reset or restarted according to the second configuration information, then the beam failure recovery timer can be restarted when the triggered random access is initiated. If the beam failure recovery timer expires when the timer value is T, the time period from the initiation of the triggered random access to the expiration of the beam failure recovery time is T, that is, the time period during which the UE occupies the resource of contention-free random access is T.

If it is determined that the beam failure recovery timer is not to be reset or restarted according to the second configuration information, then when the triggered random access is initiated, the timing can be continued based on the current timing value t of the beam failure recovery timer. In this case, the time period from the initiation of the triggered random access to the expiration of the beam failure recovery timer is T-t, that is, the time period during which the UE occupies the resource of contention-free random access is T-t.

As such, by providing the second configuration information control device when the user initiates a random access triggered, whether to reset an operating beam failure recovery timer, the controllability of the beam failure recovery timer is improved, and thereby improving the controllability of the time period during which the UE occupies the resource of contention-free random access.

The second configuration information may be configured by a base station in real time, for example, the second configuration information may be sent by the base station through an RRC message, or pre-stored in the electronic device, for example, set up by the manufacturer of the electronic device when the electronic device leaves the factory.

In an embodiment, when a random access is currently ongoing by the UE, if the random access is triggered due to beam failure recovery, a number of times of repeatedly sending a preamble during the random access process may be detected. If the number is less than a preset number, the beam failure recovery timer may be reset or restarted.

Figure 4:
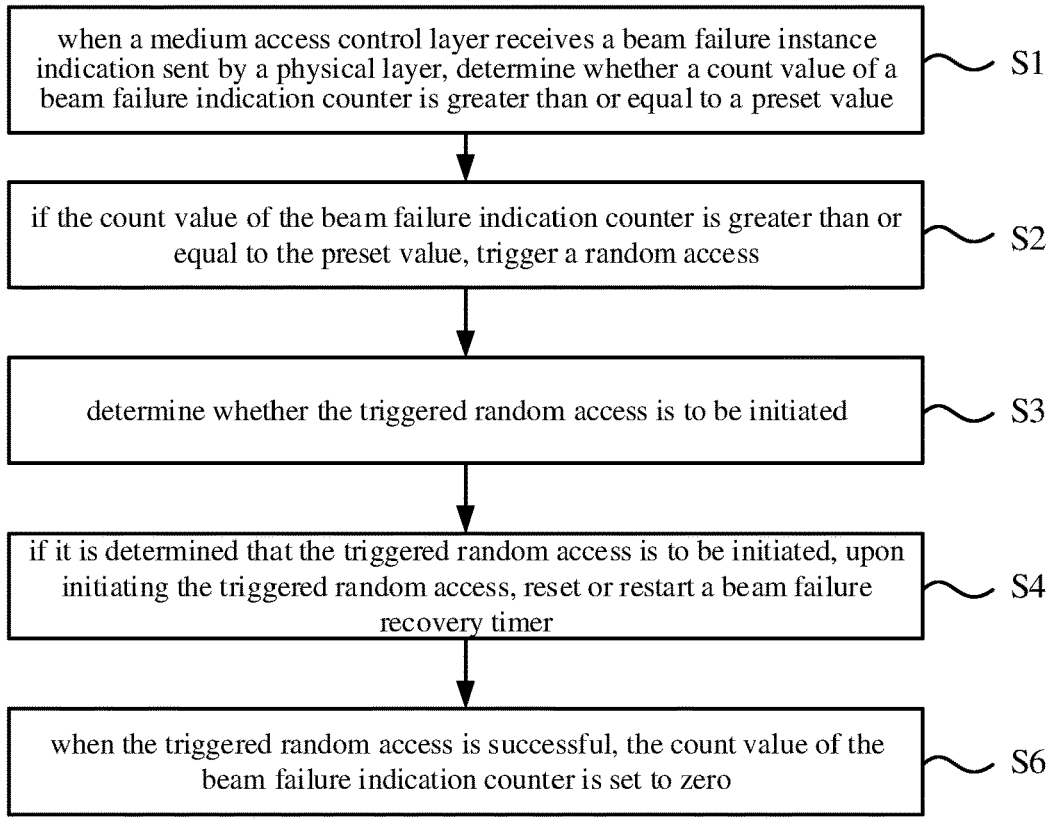
FIG. 4 is a schematic flowchart illustrating still another method for controlling a timer according to some embodiments of the present disclosure.

FIG. 4 is a schematic flowchart illustrating still another method for controlling a timer according to some embodiments of the present disclosure. As shown in FIG. 4, the method further includes:

At step S6, when the triggered random access is successful, the count value of the beam failure indication counter is set to zero.

In one embodiment, when the triggered random access is successful, that is, the triggered random access is completed. In this case, the count value of the beam failure indication counter can be set to zero, that is, although the physical layer may send the beam failure instance indication to the medium access control layer, due to the count value of the beam failure indication counter is set to zero, that is, the count value of the beam failure indication counter is less than the preset value, which does not meet the condition for triggering random access, the random access may not be triggered again, and only the count value of the beam failure indication counter is increased by one, thereby avoiding frequent triggering of the random access.

It should be noted that the success of random access referred to in this embodiment may be that the UE determines that the random access is successful by receiving information about the physical control downlink channel.

Figure 5:
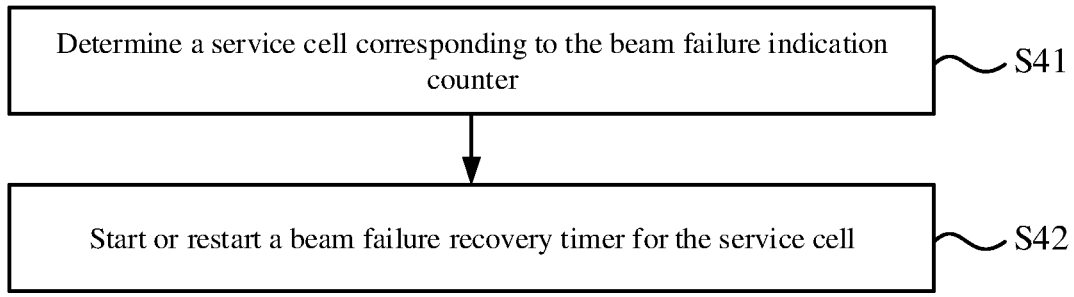
FIG. 5 is a schematic flowchart illustrating still another method for controlling a timer according to some embodiments of the present disclosure.

FIG. 5 is a schematic flowchart illustrating still another method for controlling a timer according to some embodiments of the present disclosure. As shown in FIG. 5, resetting or restarting the beam failure recovery timer includes:

At step S41, a serving cell corresponding to the beam failure indication counter is determined;

At step S42, a beam failure recovery timer is reset or restarted for the serving cell.

In one embodiment, since the beam failure indication counter may be configured for a serving cell, the serving cell includes at least one of the following: a primary cell, a primary secondary cell, and a serving cell other than the primary cell and the primary secondary cell. Therefore, for the beam failure indication counter whose count value is greater than or equal to the preset value, the serving cell corresponding to the beam failure indication counter may be determined, and then the beam failure recovery timer may be reset or restarted for the serving cell to avoid the cell corresponding to the beam failure indication counter whose count value is less than the preset value resets or restarts the beam failure recovery timer by mistake.

Corresponding to the foregoing embodiment of the timer control method, the present disclosure also provides an embodiment of a timer control apparatus.

Figure 6:
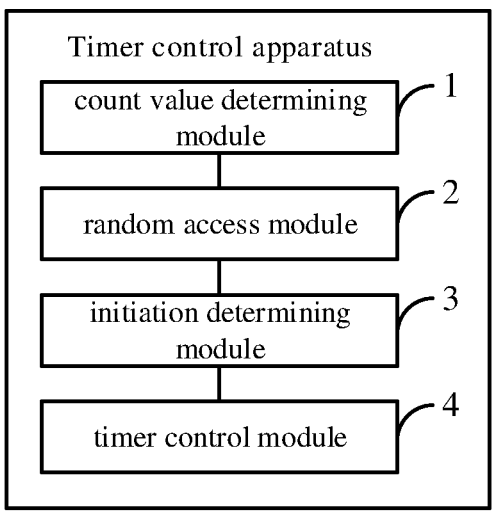
FIG. 6 is a schematic block diagram illustrating an apparatus for controlling a timer according to some embodiments of the present disclosure.

FIG. 6 is a schematic block diagram illustrating an apparatus for controlling a timer according to some embodiments of the present disclosure. The timer control apparatus shown in this embodiment may be applied to an electronic device. The electronic device may be a UE for communication. The UE may be a mobile phone, a tablet computer, a smart wearable device, etc., where the UE may communicate via NR.

As shown in FIG. 6, the timer control apparatus includes:

a count value determining module 1, configured to, when a medium access control layer receives a beam failure instance indication sent by a physical layer, determine whether a count value of a beam failure indication counter is greater than or equal to a preset value;

a random access module 2, configured to, if the count value of the beam failure indication counter is greater than or equal to the preset value, trigger a random access;

an initiation determining module 3, configured to determine whether the triggered random access is to be initiated;

a timer control module 4, configured to, in case it is determined that the triggered random access is to be initiated, upon initiating the triggered random access, reset or restart a beam failure recovery timer.

Optionally, the initiation determining module 3 is configured to in case that a random access is currently ongoing by the electronic device, determine whether to initiate the triggered random access or continue the currently ongoing random access according to first configuration information.

If a determination result indicates to initiate the triggered random access, the triggered random access is initiated by the random access module.

Optionally, the timer control module is further configured to, after the random access is triggered, and before the triggered random access is initiated, keep the beam failure recovery timer timing based on the current timing value.

Figure 7:
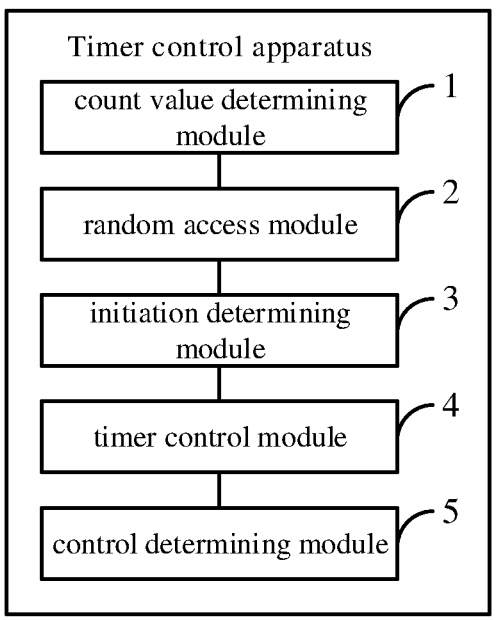
FIG. 7 is a schematic block diagram illustrating another apparatus for controlling a timer according to some embodiments of the present disclosure.

FIG. 7 is a schematic block diagram illustrating another apparatus for controlling a timer according to some embodiments of the present disclosure. As shown in FIG. 7, based on the embodiment shown in FIG. 6, the timer control apparatus further includes:

a control determining module 5, configured to before the timer control module 4 resets or restarts the beam failure recovery timer, determine whether to reset or restart the beam failure recovery timer according to second configuration information;

if a determination result is to reset or restart the beam failure recovery timer, reset or restart the beam failure recovery timer.

Figure 8:
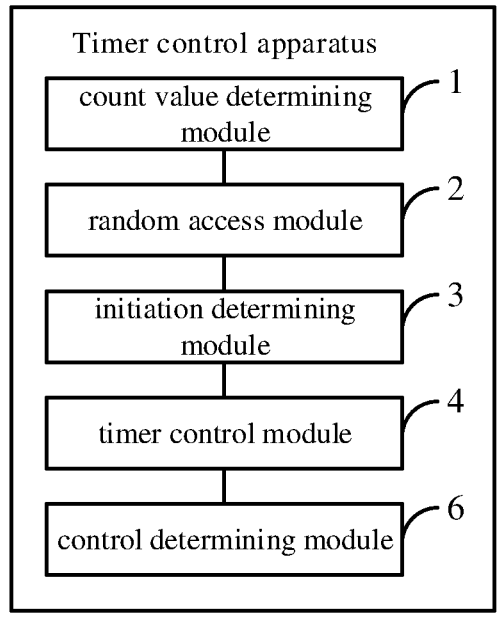
FIG. 8 is a schematic block diagram illustrating still another apparatus for controlling a timer according to some embodiments of the present disclosure.

FIG. 8 is a schematic block diagram illustrating still another apparatus for controlling a timer according to some embodiments of the present disclosure. As shown in FIG. 8, based on the embodiment shown in FIG. 6, the timer control apparatus further includes:

a counter control module 6, configured to when the triggered random access is successful, set the count value of the beam failure indication counter to zero.

Figure 9:
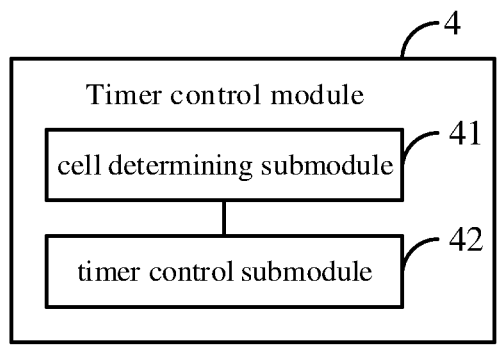
FIG. 9 is a schematic block diagram illustrating a timer control module according to some embodiments of the present disclosure.

FIG. 9 is a schematic block diagram illustrating a timer control module according to some embodiments of the present disclosure. As shown in FIG. 9, based on the embodiment shown in FIG. 6, the timer control module 4 includes:

a cell determining submodule 41, configured to determine a serving cell corresponding to the beam failure indication counter;

a timer control submodule 42, configured to reset or restart a beam failure recovery timer for the serving cell.

Optionally, the serving cell includes at least one of the following:

a primary cell, a primary secondary cell, and a serving cell other than the primary cell and the primary secondary cell.

With regard to the device in the above examples, the specific manner in which the respective modules perform the operations has been described in detail in the examples of the related methods, and will not be explained in detail herein.

Since the device examples substantially correspond to the method examples, a reference may be made to part of the descriptions of the method examples for the related part. The device examples described above are merely illustrative, where the units described as separate members may be or not be physically separated, and the members displayed as units may be or not be physical units, i.e., may be located in one place, or may be distributed to a plurality of network units. Part or all of the modules may be selected according to actual requirements to implement the objectives of the solutions in the examples. Those of ordinary skill in the art may understand and carry out them without creative work.

The embodiments of the present disclosure also provide an electronic device, including:

a processor;

a memory for storing executable instructions by the processor;

wherein, the processor is configured to perform the method of any of the above embodiments.

The embodiments of the present disclosure also provide a computer readable storage medium storing a computer program thereon, when the computer program is executed by a processor, the steps in method of any of the above embodiments are implemented.

Figure 10:
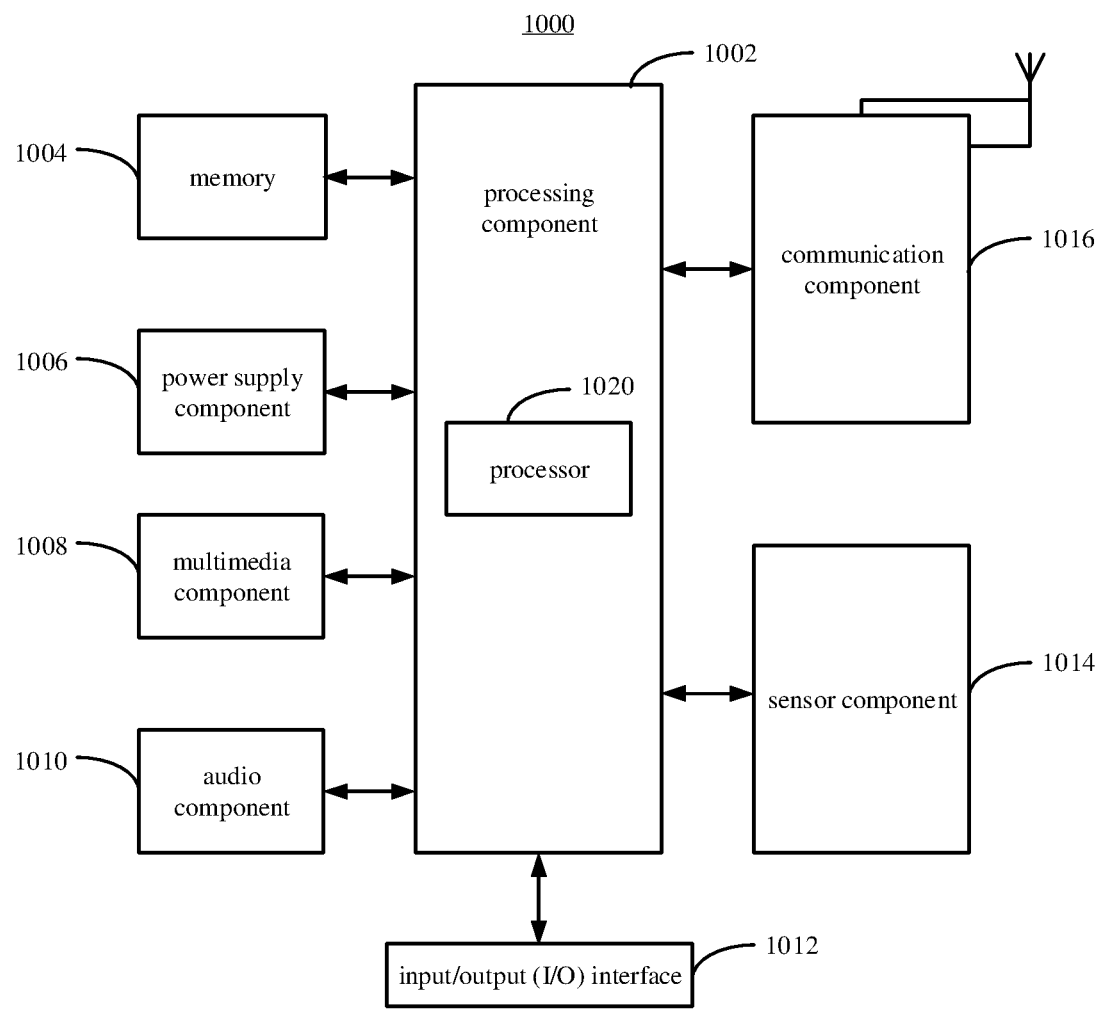
FIG. 10 is a schematic block diagram illustrating an apparatus for random access control according to some embodiments of the present disclosure.

FIG. 10 is a schematic block diagram illustrating an apparatus 1000 for random access control according to some embodiments of the present disclosure. For example, apparatus 1000 can be a mobile phone, a computer, a digital broadcast terminal, a message transmitting and receiving device, a gaming console, a tablet device, a medical device, a fitness device, a personal digital assistant, and the like.

As shown in FIG. 10, the apparatus 1000 may include one or more of the following components: a processing component 1002, a memory 1004, a power supply component 1006, a multimedia component 1008, an audio component 1010, an input/output (I/O) interface 1012, a sensor component 1014, and a communication component 1016.

The processing component 1002 generally controls overall operations of the apparatus 1000, such as operations associated with display, phone calls, data communications, camera operations, and recording operations. Processing component 1002 can include one or more processors 1020 to execute instructions to perform all or part of the steps described above. In addition, the processing component 1002 may include one or more modules which facilitate the interaction between the processing component 1002 and other components. For example, processing component 1002 can include a multimedia module to facilitate interaction between multimedia component 1008 and processing component 1002.

Memory 1004 is configured to store various types of data to support operation at device 1000. Examples of such data include instructions for any application or method operated on the apparatus 1000, contact data, phonebook data, messages, pictures, videos, and so on. The memory 1004 may be implemented by any type of volatile or non-volatile memory devices or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a magnetic or compact disk.

Power component 1006 provides power to various components of apparatus 1000. Power component 1006 can include a power management system, one or more power sources, and other components associated with generating, managing, and distributing power for apparatus 1000.

The multimedia component 1008 includes a screen between the device 1000 and the user that provides an output interface. In some examples, the screen can include a liquid crystal display (LCD) and a touch panel (TP). If the screen includes a touch panel, the screen can be implemented as a touch screen to receive input signals from the user. The touch panel includes one or more touch sensors to sense touches, swipes, and gestures on the touch panel. The touch sensor may sense not only the boundary of the touch or sliding action, but also the duration and pressure associated with the touch or slide operation. In some examples, the multimedia component 1008 may include a front camera and/or a rear camera. When the device 1000 is in an operation mode, such as a shooting mode or a video mode, the front camera and/or the rear camera can receive external multimedia data. Each front and rear camera can be a fixed optical lens system or have focal length and optical zoom capabilities.

The audio component 1010 may be configured to output and/or input an audio signal. For example, the audio component 1010 may include a microphone (MIC) configured to receive an external audio signal when the apparatus 1000 is in an operating mode, such as a call mode, a recording mode, and a voice recognition mode. The received audio signal may be further stored in the memory 1004 or sent via the communication component 1016. In some examples, the audio component 1010 further includes a speaker to output an audio signal.

The I/O interface 1012 provides an interface between the processing component 1002 and peripheral interface modules. The above peripheral interface modules may be a keyboard, a click wheel, buttons, and so on. These buttons may include, but are not limited to, a home button, a volume button, a start button, and a lock button.

The sensor component 1014 may include one or more sensors to provide status assessments of various aspects for the apparatus 1000. For example, sensor component 1014 can detect an open/closed state of apparatus 1000, a relative positioning of components, such as the display and keypad of apparatus 1000, and sensor component 1014 can also detect a change in position of apparatus 1000 or a component of apparatus 1000, the presence or absence of user contact with apparatus 1000, orientation or acceleration/deceleration of apparatus 1000, and temperature change of apparatus 1000. The sensor component 1014 may include a proximity sensor configured to detect the presence of a nearby object without any physical contact. The sensor component 1014 may further include an optical sensor, such as a CMOS or CCD image sensor which is used in imaging applications. In some examples, the sensor component 1014 may further include an acceleration sensor, a gyroscope sensor, a magnetic sensor, a pressure sensor, or a temperature sensor.

The communication component 1016 may be configured to facilitate wired or wireless communication between the apparatus 1000 and other devices. The apparatus 1000 can access a wireless network based on a communication standard, such as WiFi, 2G or 3G, or a combination thereof. In an exemplary example, communication component 1016 receives broadcast signals or broadcast associated information from an external broadcast management system via a broadcast channel. In an exemplary example, the communication component 1016 also includes a near field communication (NFC) module to facilitate short range communication. For example, the NFC module can be implemented based on radio frequency identification (RFID) technology, infrared data association (IrDA) technology, ultra-wideband (UWB) technology, Bluetooth (BT) technology, and other technologies.

In an exemplary example, apparatus 1000 may be implemented by one or more application specific integrated circuits (ASICs), digital signal processors (DSPs), digital signal processing devices (DSPDs), programmable logic devices (PLDs), field programmable gate array (FPGA), controller, microcontroller, microprocessor or other electronic elements for performing the method described in any of the above examples.

In an exemplary example, there is also provided a non-transitory computer readable storage medium comprising instructions, such as a memory 1004 comprising instructions executable by processor 1020 of apparatus 1000 to perform the above method. For example, the non-transitory computer readable storage medium may be a ROM, a random access memory (RAM), a CD-ROM, a magnetic tape, a floppy disk, and an optical data storage device.

Other implementations of the present disclosure will be readily apparent to those skilled in the art after implementing the disclosure by referring to the specification. The present application is intended to cover any variations, uses, or adaptations of the present disclosure, which are in accordance with the general principles of the present disclosure and include common general knowledge or conventional technical means in the art that are not disclosed in the present disclosure. The specification and examples therein are only illustrative, and the scope and spirit of the disclosure are to be indicated by appended claims.

It is to be understood that this disclosure is not limited to the above described structures shown in the drawings, and various changes and modifications can be made to the disclosure without departing from the scope thereof. The scope of the disclosure is to be limited only by the appended claims.

It shall be noted that the relational terms such as "first" and "second" used herein are merely intended to distinguish one entity or operation from another entity or operation rather than to require or imply any such actual relation or order existing between these entities or operations. Also, the term "including", "containing" or any variation thereof is intended to encompass non-exclusive inclusion, so that a process, method, article or device including a series of elements includes not only those elements but also other elements not listed explicitly or those elements inherent to such a process, method, article or device. Without more limitations, an element defined by the statement "including a . . . " shall not be precluded to include additional same elements present in a process, method, article or device including the elements.

The above are detailed description of a method and a device provided according to the examples of the present disclosure. Specific examples are used herein to set forth the principles and the implementing methods of the present disclosure, and the descriptions of the above examples are only meant to help understanding of the method and the core idea of the present disclosure. Meanwhile, those of ordinary skill in the art may make alterations to the specific examples and the scope of application in accordance with the idea of the present disclosure. In conclusion, the contents of the present specification shall not be interpreted as limiting the present disclosure.

The invention claimed is:

1. A timer control method, being applicable to an electronic device, comprising:
in response to a medium access control layer receiving a beam failure instance indication sent by a physical layer, determining whether a count value of a beam failure indication counter is greater than or equal to a preset value;
in response to the count value of the beam failure indication counter being greater than or equal to the preset value, triggering a random access;
determining whether the triggered random access is to be initiated; and
in response to a determination that the triggered random access is to be initiated, upon initiating the triggered random access, resetting or restarting a beam failure recovery timer.

2. The method of claim 1, wherein determining whether the triggered random access is to be initiated comprises:
in response to a random access being currently ongoing by the electronic device; determining whether to initiate the triggered random access or continue the currently ongoing random access according to configuration information; and
in response to a determination result that indicates to initiate the triggered random access, initiating the triggered random access.

3. The method of claim 1, further comprising:
after the random access is triggered and before the triggered random access is initiated, keeping the beam failure recovery timer timing based on a current timing value.

4. The method of claim 1, further comprising:
before resetting or restarting the beam failure recovery timer, determining whether the beam failure recovery timer is to be reset or restarted according to configuration information; and
in response to a determination result that the beam failure recovery timer is to be reset or restarted, resetting or restarting the beam failure recovery timer.

5. The method of claim 1, further comprising:
in response to the triggered random access being successful, setting the count value of the beam failure indication counter to zero.

6. The method of claim 1, wherein resetting or restarting the beam failure recovery timer comprises:
determining a serving cell corresponding to the beam failure indication counter; and
resetting or restarting the beam failure recovery timer for the serving cell.

7. The method of claim 6, wherein the serving cell comprises at least one of:
a primary cell,
a primary secondary cell, and
a serving cell other than the primary cell and the primary secondary cell.

8. An electronic device, comprising:
a processor; and
a memory storing instructions executable by the processor,
wherein the processor is configured to:
in response to a medium access control layer receiving a beam failure instance indication sent by a physical layer, determine whether a count value of a beam failure indication counter is greater than or equal to a preset value;
in response to the count value of the beam failure indication counter being greater than or equal to the preset value, trigger a random access;

determine whether the triggered random access is to be initiated; and in response to a determination that the triggered random access is to be initiated, upon initiating the triggered random access, reset or restart the beam failure recovery timer.

9. The electronic device of claim 8, wherein the processor is further configured to:

in response to a random access being currently ongoing by the electronic device, determine whether to initiate the triggered random access or continue the currently ongoing random access according to configuration information; and in response to a determination result indicates to initiate the triggered random access, initiate the triggered random access.

10. The electronic device of claim 8, wherein the processor is further configured to, after the random access is triggered, and before the triggered random access is initiated, keep the beam failure recovery timer timing based on a current timing value.

11. The electronic device of claim 8, wherein the processor is further configured to:

resetting or restarting the beam failure recovery timer, determine whether the beam failure recovery timer is to be reset or restarted according to configuration information; and in response to a determination result that the beam failure recovery timer is to be reset or restarted, reset or restart the beam failure recovery timer.

12. The electronic device of claim 8, wherein the processor is further configured to:

in response to the triggered random access being successful, set a count value of the beam failure indication counter to zero.

13. The electronic device of claim 8, wherein the processor is further configured to:

determine a serving cell corresponding to the beam failure indication counter; and reset or restart a beam failure recovery timer for the serving cell.

14. The electronic device of claim 13, wherein the serving cell comprises at least one of:

a primary cell, a primary secondary cell, and a serving cell other than the primary cell and the primary secondary cell.

15. A non-transitory computer-readable medium having stored thereon instructions that, when executed by a processor of an electronic device, cause the electronic device to perform a timer control method, the method comprising:

in response to a medium access control layer receiving a beam failure instance indication sent by a physical layer, determining whether a count value of a beam failure indication counter is greater than or equal to a preset value;

in response to the count value of the beam failure indication counter being greater than or equal to the preset value, triggering a random access;

determining whether the triggered random access is to be initiated; and in response to a determination that the triggered random access is to be initiated upon initiating the triggered random access, resetting or restarting a beam failure recovery timer.

* * * * *